United States Patent
Molzahn et al.

[11] 3,897,840
[45] Aug. 5, 1975

[54] STEERING AND SPEED CONTROL SYSTEM

[75] Inventors: Herbert W. Molzahn; John E. Van Wagner, both of Hamilton, Canada

[73] Assignee: International Harvester Company, Chicago, Ill.

[22] Filed: July 19, 1974

[21] Appl. No.: 489,973

[52] U.S. Cl. ............... 180/6.48; 74/479; 74/480 R
[51] Int. Cl.² ........................................ B62D 11/04
[58] Field of Search ........... 180/6.3, 6.48; 74/471 R, 74/479, 480 R

[56] References Cited
UNITED STATES PATENTS

| | | | |
|---|---|---|---|
| 3,065,700 | 11/1962 | Blenkle | 180/6.48 UX |
| 3,581,497 | 6/1971 | Krumholz | 180/6.48 |
| 3,792,744 | 2/1974 | Gray | 180/6.48 |

Primary Examiner—David Schonberg
Assistant Examiner—John A. Pekar
Attorney, Agent, or Firm—Neal C. Johnson; Floyd B. Harman

[57] ABSTRACT

A self-propelled vehicle having a pair of drive wheels wherein each wheel is independently powered through a hydrostatic drive unit including a variable displacement pump and a motor driven thereby. A control system accessible to an operator includes a steering wheel and a speed control lever. The steering wheel and control lever are both connected to a control shaft which is in turn connected to the individual pumps for varying the displacement and thus the output of each pump. The control shaft is rotatable by the steering wheel to vary the pump outputs relative to each other to steer the vehicle. The speed control lever is arranged to shift the control shaft and vary the pump displacements equally to provide speed control for the vehicle in both forward and reverse directions.

1 Claim, 6 Drawing Figures

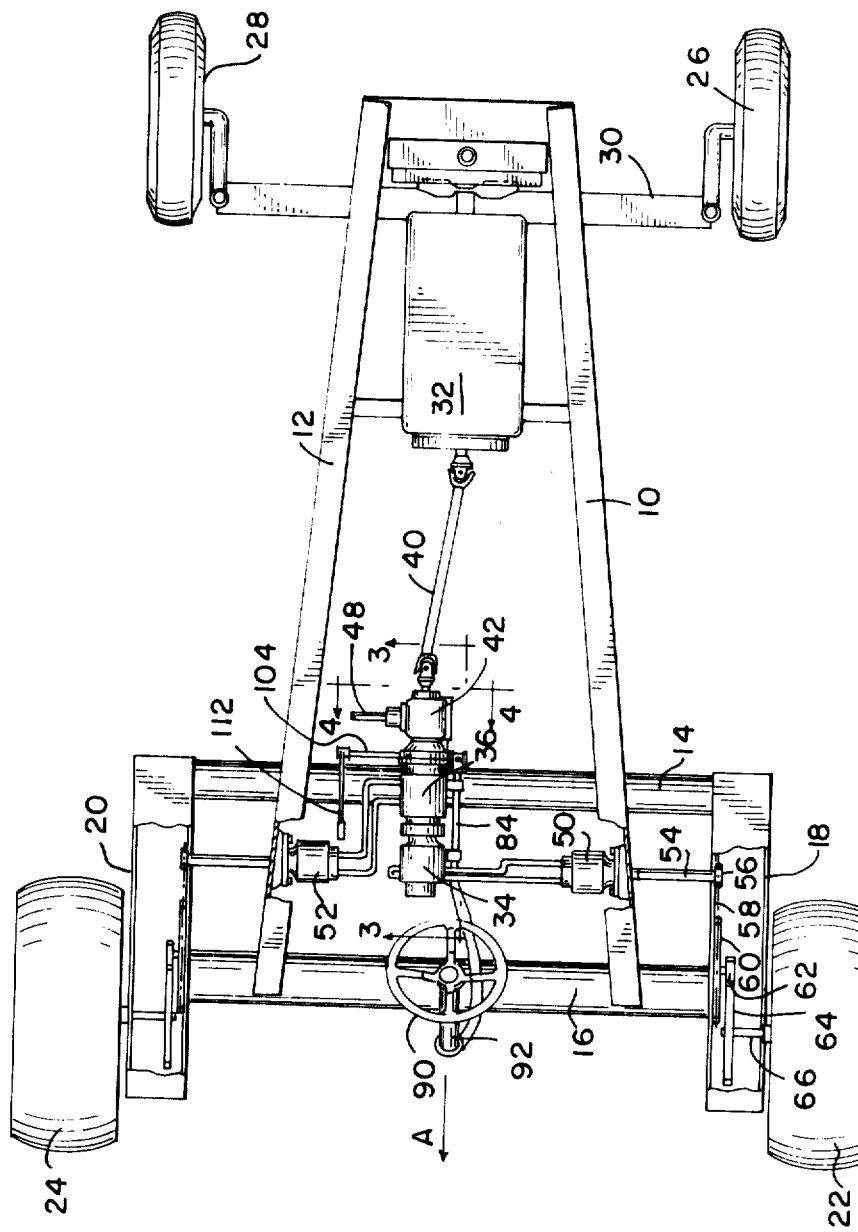

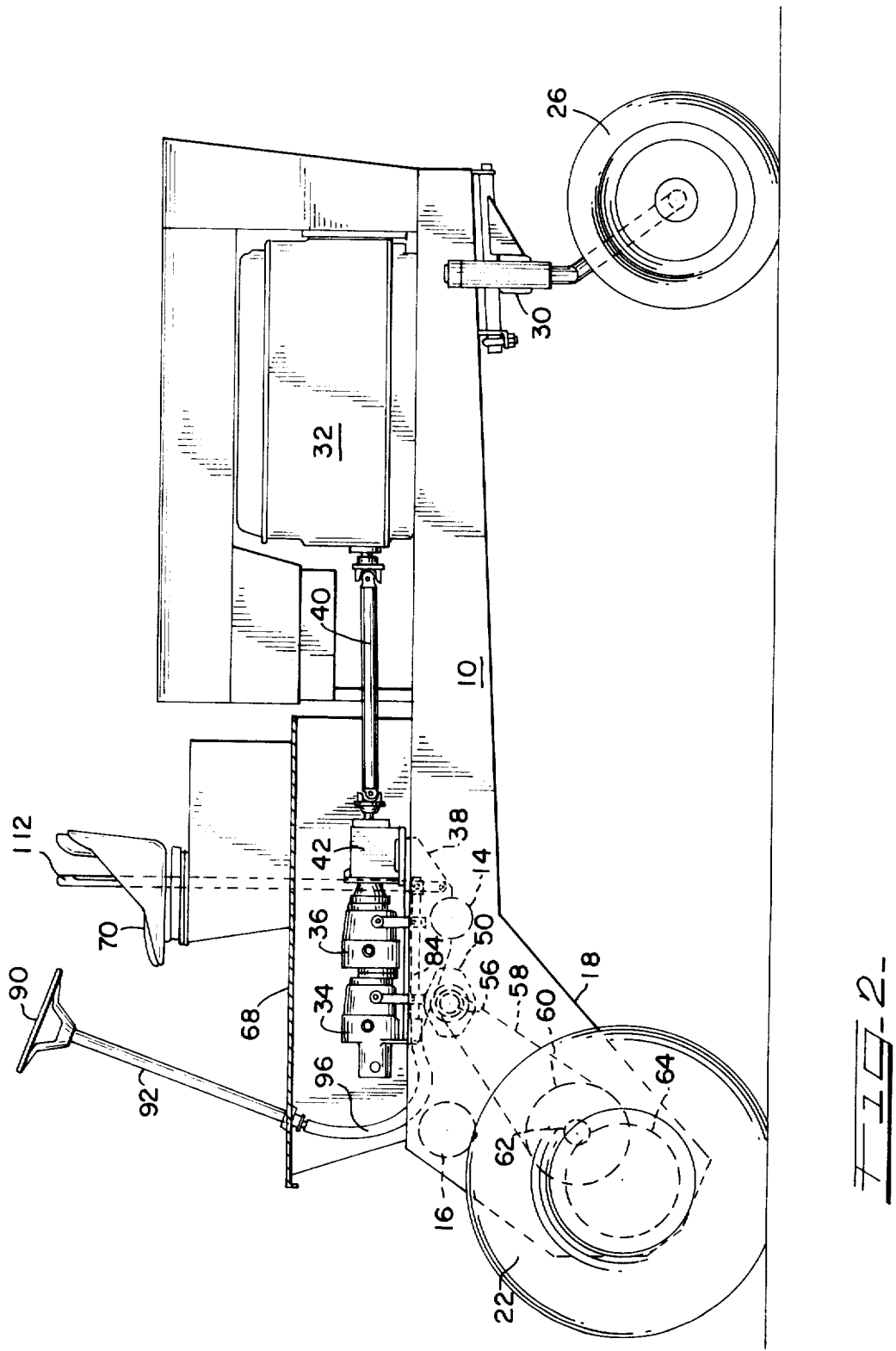

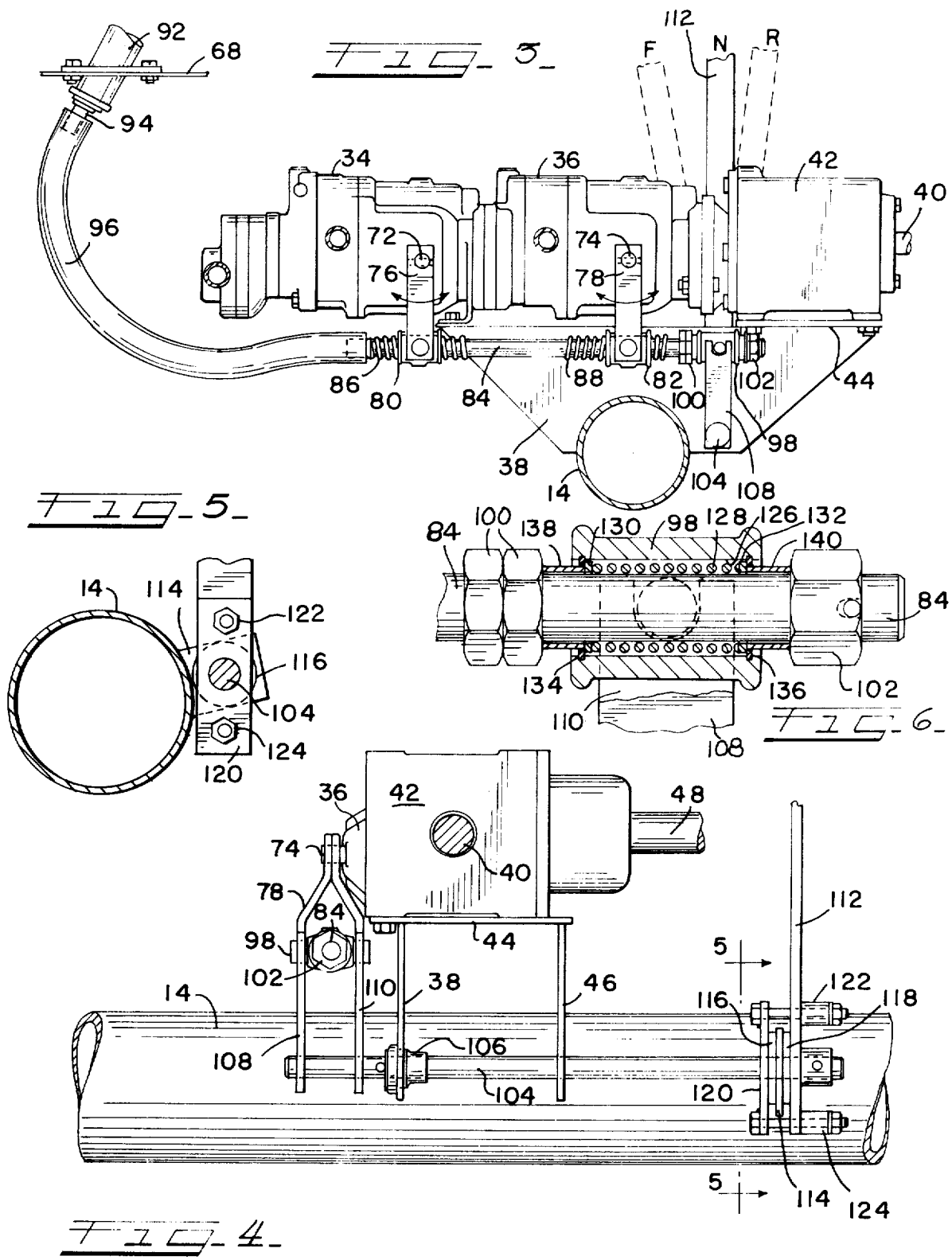

STEERING AND SPEED CONTROL SYSTEM

BACKGROUND OF THE INVENTION

1. Field of the Invention

The invention relates generally to speed and steering controls for self-propelled vehicles and more particularly to a speed and steering control system for a vehicle powered by a pair of hydrostatic drive units.

2. Prior Art

U.S. Pat. Nos. 3,528,519; 3,647,011; 3,599,741; 3,478,831; 3,581,497; 3,526,153; 3,461,669; 3,596,732.

The art is repleat with examples of hydrostatic drives having two pump — two motor systems independently controllable so as to effect steering-by-driving and variable speed operation. Class 180 subclass 6.48 provides many examples including several as applied to self-propelled vehicles for agricultural use. The basic problem is simple to state but difficult to achieve — to design a system for controlling the drive which provides sensitive, precise, and safe operation of the vehicle, all in conjunction with considerations of manufacturing and maintenance costs.

Included within the category of safe operation is the important consideration of operator fatigue. Some prior systems require that the operator hold one or more control elements against spring or spring-like forces to initiate or maintain a desired speed or direction of operation.

The prior art is perhaps characterized by one predominant qualification or suggestion — that a rather complex combination of links, levers, arms, gears, and cables is necessary to provide adequate control of the speed and direction of the vehicle.

SUMMARY

The invention provides an improved control system for a self-propelled vehicle having a pair of drive wheels each of which being driven through a hydrostatic drive unit having a pump and a motor. The invention includes a unique interrelationship of the two pumps of the drive units and simplified steering and speed controls operatively connected to the pumps. The pumps are arranged in tandem and in coaxial alignment. A single control shaft is disposed parallel to the axis of the pumps and connected thereto for changing the outputs of the pumps upon rotation or axial shifting of the control shaft. The control shaft is rotatable to vary the pump displacements relative to each other to steer the vehicle. Axial shifting of the control shaft changes the pump displacements equally to thus vary the forward or reverse speed of the vehicle.

Rotation and axial shifting of the control shaft are provided by a steering wheel and a lever respectively, both conveniently accessible to the operator. The wheel and lever are arranged to provide respective steering and speed control without requiring input of manual forces against springs or the like.

Briefly, the objects of the invention are to provide a control system for a pair of hydrostatic drives wherein the system is: responsive to operator input providing safe operation of the vehicle; easy to operate resulting in a minimum of operator fatigue; and, simple in construction resulting in reduced costs of manufacturing and maintenance.

BRIEF DESCRIPTION OF THE DRAWINGS

FIG. 1 is a plan view of a self-propelled vehicle using the speed and steering control system of the invention;

FIG. 2 is a side elevation view of the vehicle of FIG. 1;

FIG. 3 is an enlarged fragmentary sectional view in elevation of the speed and control system taken along lines 3—3 of FIG. 1;

FIG. 4 is an enlarged fragmentary sectional view in elevation taken along lines 4—4 of FIG. 1;

FIG. 5 is a cross-section taken along lines 5—5 of FIG. 4; and

FIG. 6 is an enlarged sectional view in elevation of a portion of the control system.

DESCRIPTION OF THE PREFERRED EMBODIMENT

Referring to FIGS. 1 and 2 there is shown a self-propelled vehicle adapted to support and operate a crop-harvester platform (not shown) for windrowing hay or grain crops. The forward direction of travel is shown by the arrow A. The vehicle includes a pair of longitudinal frame members 10 and 12 of channel-section. A pair of tubular cross-frame members 14 and 16 is welded to the frame members 10 and 12 and project transversely beyond the opposite ends thereof. A pair of final-drive housings 18 and 20 is secured to the respective opposite ends of the cross-frame members 14 and 16. The housings 18 and 20 project downwardly and somewhat forwardly from the members 14 and 16 as shown in FIG. 2 with reference to the housing 18.

The forward end of the vehicle is supported on drive wheels 22 and 24 journaled outwardly of the housings 18 and 20 respectively. The rear of the vehicle is supported on a pair of caster wheels 26 and 28 swingably mounted on a cross beam 30. The beam 30 is pivotally connected to suitable cross-bracing at the rear of the frame members 10 and 12 for pivotal movement about the longitudinal centerline of the vehicle.

The vehicle is powered from an engine 32 mounted on the frame toward the rear of the vehicle. As will be described, the engine provides mechanical power for a pair of hydrostatic drive units for the respective drive wheels 22 and 24. The drive units each include a variable displacement rotary pump hydraulically connected in a closed loop to a rotary motor.

In accordance with the invention, the pumps are shown at 34 and 36 interconnected in coaxial relation so as to be drivable by a common input. As best shown in FIG. 3 the pumps 34 and 36 are supported from a plate 38 which is mounted on the cross-frame member 14. Mechanical power to drive the pumps is transferred from the engine 32 through a drive shaft 40 to a gearbox 42 connected coaxially to the rearmost pump 36. As best shown in FIGS. 3 and 4 the gearbox 42 is supported on a horizontal plate 44 which is connected to the plate 38 and an additional plate 46 secured on the cross-frame member 14.

The ultimate purpose of the gearbox 42 is to provide a power drive for the crop handling components of a harvester platform. The drive would be taken from a drive shaft 48 shown in FIGS. 1 and 4 extending laterally from the gearbox 42. It will be understood that the gearbox 42 is a single input, dual-output type, with the outputs going (1) to the aligned pumps 34 and 36 and (2) to a harvester platform through the shaft 48.

The motors of the hydrostatic drive units are shown at 50 and 52 (FIG. 1) bolted to the channel members 10 and 12 respectively. It will be understood that the motors 50 and 52 are hydraulically connected to the respective pumps 34 and 36 through suitable circuitry (shown only diagrammatically). Of course, the overall hydraulic system includes the necessary reservoir, cooler, filters, etc., will understood in the art.

The rotary drive provided by the motors 50 and 52 is transferred mechanically to the respective drive wheels 22 and 24 by means shown diagrammatically in FIGS. 1 and 2. An output shaft 54 extends from the motor 50 through the channel 10 and into the final drive housing 18. A sprocket 56 is secured on the shaft 54 within the housing 18. A chain 58 drivingly interconnects the sprocket 56 with a sprocket 60 journaled within the housing. Mounted coaxially with the sprocket 60 is a gear 62 disposed in driving engagement with a bullgear 64. The bullgear 64 is secured on a stub shaft 66 journaled in the housing 18 and upon which the drive wheel 22 is mounted. It will be understood that the final drive from the other motor 52 to the drive wheel 24 is identical to that described above.

As shown in FIG. 2 the vehicle includes a operator's station including a deck 68 disposed above the vehicle frame structure and upon which a seat 70 is mounted. The primary controls for operating the vehicle will be hereinafter described.

In accordance with the invention, means are provided, accessible to the operator, for readily controlling the speed and direction of the vehicle. As best shown in FIG. 3 the pumps 34 and 36 include respective stub shafts 72 and 74 extending laterally therefrom. It will be understood that these shafts control the angle of the swash plates (not shown) within the respective pumps to vary the pump displacements and thus vary the speeds of the respective motors. Bifurcated control arms 76 and 78 are secured to the stub shafts 72 and 74 respectively and extend generally downwardly therefrom. Trunnions 80 and 82 are pivotally connected to the lower ends of the control arms 76 and 78 respectively. The trunnions are internally threaded with respective right and left-hand threads for purposes to be described.

The control apparatus of the invention includes an elongated control shaft 84 disposed parallel to the aligned axes of the pumps 34 and 36. The control shaft 84 includes externally threaded portions 86 and 88 of respective right and left-hand threads received through the trunnions 80 and 82 respectively. The effect of the threaded connections is to swing the control arms 76 and 78 is opposite directions in response to rotation of the control shaft 84 about its longitudinal axis.

As shown generally in FIGS. 1 and 2 a steering wheel 90 is mounted on a steering column 92 supported from the operator's deck 68. The wheel 90 is secured to a steering shaft 94 journaled in the column 92 and projecting therebelow as shown in FIG. 3. A flexible connector tube 96 interconnects the driving shaft 94 and the forward end of the control shaft 84. Accordingly, rotation of the steering wheel 90 rotates the control shaft 84 about its axis. As explained above the opposed threads 86 and 88 cause the control arm 76 and 78 to pivot in opposite directions when the shaft 84 is rotated. The outputs from the respective pumps 34 and 36 are thus changed relative to each other resulting in relative speed changes in the respective motors 52 and 54 to turn the vehicle.

The forward and reverse speed of the vehicle is controllable through a system to be now described. As best seen in FIGS. 3 and 4 a trunnion 98 is sleeved over the rearward end of the control shaft 84. The shaft-receiving portion of the trunnion 98 has an inner diameter greater than the outer diameter of the shaft 84 to permit the shaft 84 to rotate relative to the trunnion. The trunnion is disposed between a set of lock nuts 100 and 102 to limit relative axial movement of the trunnion and the control shaft. The details of this connection will be subsequently described in greater detail.

As best shown in FIG. 4 a rockshaft 104 is journaled in a bearing 106 mounted in the plate 38. A pair of strap members 108 and 110 is secured to the rockshaft 104 and extend upwardly to pivotally engage opposite sides of the trunnion 98. The rockshaft 104 extends through the plate 46 and terminates at a connection with a speed control lever 112. As shown in FIG. 1 the control lever 112 extends upwardly through the operator's deck 68 so as to be readily accessible for fore-and-aft pivotal movement.

The speed control lever 112 is connected to the rockshaft 104 by a connection shown in FIGS. 4 and 5 which retains the lever in any selected position through a frictional interengagement. As shown in FIG. 5 the rockshaft 104 extends through a support plate 114 welded to the rear of the cross-frame member 14. A pair of annular members 116 and 118 is disposed about the rockshaft 104 in flanking relation to the plate 114. The members 116 and 118 are retained between a plate 120 and the lever 112 by a pair of bolt and nut assemblies 122 and 124. The frictional force of engagement among the members 116 and 118 and the support plate 14 can be varied by adjusting the assemblies 122 and 124.

As will be seen with reference to FIG. 6 the above described speed lever control linkage is coupled to the control shaft 84 in a manner which permits limited axial movement between the shaft 84 and the trunnion 98. The trunnion 98 includes an axial bore 126 of greater diameter than the control shaft 84 to provide an annular space therebetween. A coil spring 128 is received in the space and is axially interposed between a pair of rings 130 and 132 which are axially movable over the shaft 84. The spring 128 and the rings 130 and 132 are retained within the trunnion 98 by snap rings 134 and 136 seated near the opposite ends of the trunnion as shown. Abutment sleeves 138 and 140 are disposed adjacent to the lock nuts 100 and 102 respectively in abutting relation to the rings 130 and 132 respectively.

The operation of the speed and steering control system will be briefly summarized. The vehicle speed is controlled by moving the lever 112 to shift the control shaft 84 which swings both control arms 76 and 78 in unison. The hydraulic outputs of the pumps to the respective motors are thus changed in unison and the speed of the vehicle is changed. As shown in FIG. 3 the control lever 112 is movable fowardly and rearwardly from a neutral position designated N wherein the swash plates (not shown) of the pumps are set so that no pump output is produced. As the lever 112 is moved forwardly toward the position shown at F the outputs of both pumps will be increased and thus vehicle speed will increase. Pulling the lever 112 to the position shown at R will reverse the pump outputs and thus reverse the motors.

The direction of travel of the vehicle is controlled by turning the steering wheel 90 which rotates the control shaft 84 about its axis. The oppositely threaded connections to the control arms 76 and 78 cause these arms to pivot in opposite directions to thus vary the pump outputs relative to each other. The resultant variance in the speed the motors 50 and 52 varies the speeds of the drive wheels 22 and 24 to thus turn the vehicle.

The coupling arrangement shown in FIG. 6 comes into use in the situation wherein the speed control lever 112 is in the full forward or reverse position and a direction change is to be made. In the full forward position for example, the control arms 76 and 78 will be in positions wherein further forward movement is precluded. Thus, rotation of the control shaft 84 to change the vehicle direction cannot impart further forward movement to either of the arms 76 or 78 as would be the case in other than a full ahead position of the arms. As the control shaft 84 is rotated, the reaction from the immovable arm back through its threaded-trunnion connection causes the control shaft 84 to shift axially. As will be seen in FIG. 6 the control shaft 84 can move relative to the speed control trunnion 98 due to the coil spring 128. That is, the sleeve 138 in abutment with the ring 130 will compress the spring 128 against the ring 132. Accordingly, the direction change is accomplished without changing the full-ahead speed setting. Of course, the coupling of FIG. 6 will accommodate shifting of the shaft 84 relative to the trunnion 98 in the opposite direction in the situation wherein the speed is set in full reverse.

It should be noted that there is an interrelationship between the speed and steering controls wherein a change in speed in a turn can effect a change in the turning rate. That is, having set the control arms 76 and 78 at a distance therebetween (to effect a turn) which is different from the distance therebetween when both arms are in the neutral position, and then shifting both control arms in unison by moving the control lever 112, it will be seen that the rate of turn will be varied somewhat, particularly as either one of the control arms is shifted into the neutral position.

A safety factor with the control system is in the relationship of steering sensitivity and vehicle speed. At high vehicle speeds (that is, with the control arm 76 and 78 well forward in their respective arcs of travel) even a rapid turning of the steering wheel 90 will not effect a high speed turn of the vehicle. The basic reason is that both control arms 76 and 78 are well forward to provide the high speed and the movement of each arm (to provide the turning) is within the forward speed regime. Accordingly, a dangerous spin turn is precluded.

By the foregoing applicants have provided a speed and steering control system having practical utility in accomplishing the objects of the invention.

What is claimed is:

1. In a vehicle having a pair of drive wheels, s hydrostatic drive unit for each drive wheel including a pump of variable displacement and a motor driven thereby, a control apparatus comprising:

means mounting said pumps in tandem and in coaxial alignment for driving by a common mechanical input;

a control arm pivotally connected to each pump for varying the respective output to each motor, said control arms being disposed for pivoting movement in a common plane;

a rotatable and axially shiftable control shaft disposed parallel to the aligned axes of said pumps and within said plane, said control shaft including a pair of externally threaded portions of opposite pitch;

a pair of internally threaded trunnions pivotally connected to the respective pair of control arms and respectively threadedly received on said pair of externally threaded portions, whereby rotation of said control shaft causes said control arms to pivot in opposite directions to vary the pump displacements relative to each other;

a steering control accessible to a vehicle operator for selectively rotating said control shaft to effect selective turning of the vehicle;

a speed control lever pivotally supported on the vehicle accessible to a vehicle operator;

means including a non-threaded trunnion received on said control shaft operatively coupling said control lever to said control shaft for shifting said control shaft back and forth within said plane to pivot said pump control arms in unison thereby varying the pump outputs to said motors to vary the speed of the vehicle, said non-threaded trunnion being sized to permit rotation of said control shaft relative thereto;

a pair of stops on said control shaft flanking said non-threaded trunnion;

and a spring operative between said non-threaded trunnion and said stops to permit limited axial movement of said control shaft relative to said non-threaded trunnion.

* * * * *